United States Patent [19]

Bossard et al.

[11] 3,770,371

[45] Nov. 6, 1973

[54] STABLE AQUEOUS DISPERSIONS OF CATIONIC DYESTUFFS

[75] Inventors: Werner Bossard, Riehen; François Favre, Basle, both of Switzerland

[73] Assignee: Ciba-Geigy AG, Basle, Switzerland

[22] Filed: Aug. 25, 1971

[21] Appl. No.: 174,964

Related U.S. Application Data

[63] Continuation of Ser. No. 781,610, Dec. 5, 1968, abandoned, which is a continuation-in-part of Ser. No. 575,513, Aug. 29, 1966, abandoned.

[30] Foreign Application Priority Data

Dec. 8, 1967 Switzerland.................. 17284/67
June 10, 1966 Switzerland.................... 8417/66

[52] U.S. Cl............................. 8/89, 8/79, 8/92, 8/82, 8/54, 8/177, 8/178, 8/54.2, 8/42, 8/43, 8/39, 8/51, 8/1 XA

[51] Int. Cl............................................. C09b 67/00

[58] Field of Search .................. 8/89, 79, 92, 15, 8/177, 82

[56] References Cited
UNITED STATES PATENTS 3,070,418  12/1962  Bann et al................................ 8/79
3,346,322  10/1967  Finkenauer et al................. 8/177 X
3,352,624  11/1967  Harding et al............................ 8/15

OTHER PUBLICATIONS

Vickerstaff, Physical Chem. of Dye, 1954, p. 18, 19.

Diserens, Chem. Techn. Of Dye & Print., 1951, p. 90, 91.

*Primary Examiner*—George F. Lesmes
*Assistant Examiner*—Patricia C. Ives
*Attorney*—Wenderoth, Lind & Ponack

[57] ABSTRACT

Stable aqueous dispersions of cationic or anionic dyestuffs which are, per se, water-soluble, which dispersions contain a stabilizing agent in an amount of up to about 15 percent of their weight, the balance consisting of (a) water and, dissolved in the latter, (b) an at least sparingly water-soluble salt consisting of the anion of an inorganic or organic acid and of the cation of an inorganic base, and, in the case of said dyestuff being cationic, (c) acid selected from inorganic and organic acids, the pK values of which acids are at most 4.8, the concentration of the said salt in the water being high enough to keep the dyestuff practically undissolved.

6 Claims, No Drawings

STABLE AQUEOUS DISPERSIONS OF CATIONIC DYESTUFFS

This application is a continuation application of Ser. No. 781,610, filed Dec. 5, 1968, now abandoned, which in turn is a continuation-in-part application of Ser. No. 575,513, filed Aug. 29, 1966, also abandoned.

This invention relates to new stable aqueous dispersions of cationic or anionic dyestuffs; it also concerns a process for the dyeing and printing of organic materials, especially fiber materials, with the aid of such novel aqueous dispersions.

According to a first aspect of the invention, concentrated stable aqueous dispersions of cationic dyestuffs (also termed 'color salts') are provided which are particularly suitable for the dyeing and printing of polymeric and copolymeric acrylonitrile fiber materials.

It is known that, in general, cationic dyestuffs are particularly suitable to attain fast dyeings on polymeric or copolymeric acrylonitrile fiber material. Up to the present, most of these cationic dyestuffs have been offered to the industry in the form of very dusty powders. However, working with such very dusty dyestuff powders, which moreover, generally have very high color strength, means that special precautionary measures have to be taken. For example, personnel have to wear dust masks which are uncomfortable and often unhygienic, or costly ventilation systems must be installed.

As another drawback, very finely milled dyestuff powders have a great tendency to form lumps on storing in a moist atmosphere. Also, it is often difficult to dissolve pulverulent cationic dyestuffs in water as they do not wet well and form lumps on the addition of water. This makes the preparation of dye liquors more difficult and, often, very time-consuming. There is a need, therefore, in the dyeing industry, for avoiding these disadvantages as much as possible.

Various suggestions to this end have already been made. It has been recommended that cationic dyestuffs should be offered commercially in the form of concentrated solutions which contain substantial amounts of organic solvents. However, these solutions of cationic dyestuffs have various disadvantages. They easily dry up on being stored open. Also, such concentrated solutions of cationic dyestuffs, particularly when they are exposed to great variations in temperature, involve the danger that the dissolved dyestuffs may crystallize out in the form of relatively coarse crystals when the ambient temperature decreases. On prolonged storing, such crystals will grow further, whereby the dyestuff content of the solutions is reduced so that an exact reproduction of dyestuff charges of a given composition in successive dyebaths is made difficult. Therefore, uneven dyeings or spot formation easily occur on dyeing with such partially crystallized solutions.

According to a first aspect of the invention, novel aqueous dispersions of cationic dyestuffs of concentrated liquid consistency have been found which are substantially free from the disadvantages listed above.

These novel stable aqueous dispersions have, as a characteristic feature, a content of a. at least 10 percent and at most 30 percent, calculated on the total weight of the dispersion, of water-soluble cationic color salt;

b. from about 1 to 5 percent by weight of the total dispersion, of acid selected from those inorganic and organic, monobasic and polybasic acids, the pK value of which does not exceed 4.8 (measured at room temperature; cf. pages D90 and D91 of the Handbook of Chemistry and Physics 48th Edition);

c. about 0.5 to 15 percent by weight of the total dispersion, of stabilizer selected from cationic stabilizer and nonionogenic stabilizer, the balance of said dispersion consisting of d. water and, dissolved in the latter, e. water-soluble salt consisting of the anion of an inorganic or organic mono- or polybasic acid the free acid of which has a pK value of at most 4.8 (as defined supra) and of the cation of an inorganic mono- or polyacid base the free base of which has a pK value of at most 4.8 (at 20°–25°C, see page D89 of the Handbook, supra), the salt concentration being high enough to keep the watersoluble dyestuff substantially undissolved.

The anions of water-soluble salts usable according to this aspect of the invention are derived principally from inorganic mono- or polybasic mineral acids, e.g., from hydrochloric acid, hydrobromic acid, nitric acid or from sulfuric acid. They can also be derived, however, from organic mono- or polybasic, optionally substituted carboxylic acid. As such can be used, chiefly, lower, optionally substituted, e.g., hydroxyl substituted, aliphatic monocarboxylic acids, lower aliphatic di- and tri- carboxylic acids optionally substituted by hydroxyl groups, and mono-cyclic-aromatic monocarboxylic acids. Suitable anion donors are, in the case of lower fatty acids, e.g., formic, acetic and glycolic acid; in the case of unsubstituted dicarboxylic acids, e.g., oxalic, malonic, succinic, maleic, fumaric, glutaric and adipic acid; in the case of di- and tri-carboxylic acids substituted by hydroxyl groups, e.g., tartaric and citric acid. Suitable anions of mononuclear aromatic carboxylic acids are, e.g., those of benzoic acid, chlorobenzoic acid, methylbenzoic acid and salicylic acid.

Alkali metal ions such as sodium or potassium ions, alkaline earth metal ions such as magnesium, calcium or zinc ions and also aluminium ions can be used as cations of water-soluble salts usable according to this invention aspect.

As water-soluble salts of inorganic and organic polybasic acids, also their acid salts can be used according to the first aspect of the invention. The neutral salts, however, are preferred. Examples of suitable inorganic salts are, in particular, the neutral alkali metal or ammonium salts of strong, inorganic, mono- or di-basic acids such as sodium, potassium and ammonium chloride; sodium, potassium and ammonium bromide; sodium, potassium and ammonium nitrate; sodium, potassium and ammonium sulfate or mixtures thereof; examples of suitable salts of organic acids are, in particular, the alkali metal salts of lower fatty acids, chiefly sodium and potassium acetate.

The cationic dyestuff is stabilized in the aqueous concentrate by the necessary content of the dye preparation defined above of an inorganic or organic, mono- or polybasic acid having a pK value of at most 4.8. The acid content is advantageously so chosen that the concentrated liquid dye preparation has a pH of 2 to 5. Suitable inorganic acids usable according to the invention are, in particular, mineral acids such as hydrochloric acid, hydrobromic acid or sulfuric acid. Advantageously, however, organic acids, particularly lower aliphatic carboxylic acids such as formic acid and, chiefly, acetic acid, are used.

In addition, dye preparations according to this invention aspect contain at least one cationic or, preferably, a nonionogenic stabilizer. As cationic stabilizers, amines are used, principally polyamines containing two or more basic nitrogen atoms, preferably two to five partially or completely quaternized nitrogen atoms, a polyglycol ether chain and at least one lipophilic substituent. By polyamines are meant, in particular, polyalkylene polyamine compounds the alkylene component of which preferably consists of 1,2-ethylene or of 1,2- or 1,3-propylene groups, i.e., for example, diethylenetriamine, triethylenetetramine, tetraethylenepentamine or dipropylenetriamine compounds. One nitrogen atom of these polyamines has, as lipophilic substituent, an alkyl, alkenyl or acyl radical having, particularly, 10 to 20 carbon atoms. Examples of such radicals are the tetradecyl, hexadecyl, octadecyl, eicosyl or the oleyl, myristoyl, lauroyl, palmitoyl, stearoyl, oleoyl radical. Polyglycol ether chains in the polyamines usable according to the invention contain 3 to about 100, preferably however, about 10 to 50, alkyleneoxy groups, mainly ethyleneoxy groups of which a few can be C-alkyl or C-aryl substituted. Permethylated N-octadecyldiethylene-triamine, for example, is mentioned as a particularly suitable compound which has been reacted with 15 to 20 equivalents of ethylene oxide.

Particularly suitable non-ionogenic stabilizers are surface active ethyleneoxy adducts of organic hydroxyl, carboxyl, amino or amido compounds containing aliphatic hydrocarbon radicals of, in all, at least eight carbon atoms, or mixtures of such substances. They are obtained when at least three equivalents and, preferably, more ethylene oxide are added; substituted epoxides such as styrene oxide and propylene oxide, can be individually built in. Starting materials are higher fatty alcohols, i.e., alkanols and alkenols having eight to 20 carbon atoms, fatty acids having eight to 20 carbon atoms, alkylphenols having one or more alkyl substituents containing in all at least eight carbon atoms, primary or secondary mono- or polybasic amines containing aliphatic and/or cycloaliphatic hydrocarbon radicals having at least eight carbon atoms, particularly alkanolamines having such radicals, also alkanolamides, aminoalkylamides and aminoalkyl esters of higher aliphatic carboxylic acids and higher alkylated aryloxy carboxylic acids. The number of alkyleneoxy groups in these polyglycol ethers should give them hydrophilic properties and it should be so large that the compounds can at least be easily dispersed in water and, preferably, are soluble therein. Depending on the type and composition of the lipophilic component of these compounds, the number of alkyleneoxy groups, principally ethyleneoxy groups, should be 3, particularly 5 up to about 100 and, preferably 5 to 20. The use of technical mixtures of these substances is particularly favorable.

Particularly valuable dispersions according to this invention aspect contain, as stabilizers, polyglycol ethers from alkanols, alkenols and alkyl phenols which contain aliphatic hydrocarbon radicals having, in all, at least eight carbon atoms, and at least 4 equivalents of ethylene oxide. Addition products of 4 to 20 mols of ethylene oxide to an alkanol having eight to 18 carbon atoms such as hexadecanol, the fatty alcohol mixture known by the generic term "coconut oil fatty alcohol," or an alkyl phenol the alkyl radicals of which have, in all, at least eight carbon atoms, e.g., an octyl phenol, nonyl phenol or di-tert.butyl phenyl are particularly favorable.

As other auxiliaries, the dispersions according to this aspect of the invention contain, optionally, condensation products of naphthalene sulfonic acids and formaldehyde; up to about 10 percent by weight of thickeners such as locust bean flour, alkyl celluloses or crystal gum; up to about 1 percent by weight of antifoam agents such as higher fatty alcohols or higher molecular fatty acid esters. The dispersions can also contain antigelling agents or textile finishing agents, such as antisoil or antistatic agents or softeners.

As cationic color salts, the dispersions according to this invention aspect contain the usual salts and double salts, e.g., metal halide double salts such as zinc chloride double salts, of cationic dyestuffs of the most varied classes, in particular, salts of methine or azamethine dyestuffs which contain a cyclammonium group, e.g., an indolium, pyrazolium, imidazolium, triazolium, tetrazolium, oxdiazolium, thiodiazolium, oxazolium, thiazolium, pyridinium, pyrimidinium, pyrazinium group. The heterocyclic compounds mentioned can optionally be substituted non-ionogenically and/or condensed with aromatic rings. Also cationic dyestuffs of the diphenylmethane, triphenylmethane, oxazine and thiazine series can be used as well as, finally, color salts of the arylazo and anthraquinone series having an external onium group, e.g., an alkylammonium or cyclammonium group.

The amount of cationic color salt in the concentrated liquid dye preparations according to this aspect of the in-vention is preferably 10 to 30 percent. The particle size of the dyestuff is advantageously about 0.5 to 5 $\mu$ as, if the particles are larger there is a danger of part of the dyestuff settling out of the dispersion in the form of a sediment.

The amount of salt contained in the dispersion should be at least high enough to ensure that the cationic dyestuff is substantially not dissolved. The minimal content required for the production of concentrated stable dispersions according to this aspect of the invention depends, on the one hand, on the water solubility of the cationic dyestuff used and, on the other, on the dissolving properties of the salt used. In certain cases, a salt concentration of 3 percent is sufficient. Preferably the salt content of the dyestuff dispersion is from about 5 to 25 percent. A higher salt content of the dye dispersion than is necessary for attaining complete precipitation of the cationic dyestuff under practical conditions is generally to be avoided as otherwise difficulties with regard to the solubility of the dye preparations can arise.

The amount of cationic or non-ionogenic stabilizer in the afore-said dispersions is preferably 2.5 to 10 percent by weight of the total dispersion.

The amount of water in the dispersions is generally between 40 and 80 percent by weight, preferably between 60 and 80 percent by weight.

Concentrated dispersions which prove to be particularly satisfactory contain:
  about 10–30 percent of cationic color salt,
  5–25 percent of a water-soluble inorganic alkali, earth alkali, metal or ammonium salt, particularly sodium chloride or magnesium chloride,
  1–5 percent of an organic lower fatty acid, particularly acetic acid, 2.5–10 percent of a non-ionogenic stabilizer from the class of fatty alcohol polyglycol ethers and 40–80 percent of water, all percentages being calculated on the total weight of the dispersion.

The dispersions according to this aspect of the invention are produced, advantageously, by stirring the cationic color salt or cationic dyestuff, preferably in the form of a moist filter cake or also as powder or aqueous solution or suspension, into the mixture of the other components consisting essentially of an aqueous salt solution, acid and stabilizer and optionally further adjuvants, at room temperature or raised temperature of, preferably, not over 50°C, using the usual technical mixing apparatus such as automatic stirrers, homogenizers or kneading apparatus, e.g., high velocity stirrers, turbomixers or kneaders. In many cases it is of advantage to add the main part of the stabilizer to the dispersion only after the other components have been homogenized. Moreover, it is often advantageous to comminute the cationic dyestuff mechanically in the same operation with the aid of shearing stresses produced, for instance, by grinding elements such as quartz sand or glass pearls. The mixing operation is completed as soon as complete homogenization has been attained which is, usually, the case after 4 to 6 hours.

In contrast to pulverulent cationic dyestuffs, the dispersions according to the first aspect of the invention offer the great advantage that they can be dissolved immediately and without the slightest difficulty by the addition of cold or warm water. Compared with previously known concentrated solutions, they are distinguished by the following advantages: The dispersions according to the first aspect of the invention do not tend to form sediments and can be stored for several months. Above all, they are substantially unaffected by variations in temperature and the cationic dyestuff distributed but not dissolved therein does not form a sediment and also has no tendency to partially crystallize out. In addition, the dispersions according to the first aspect of the invention are not hygroscopic and also do not tend to dry up which is always to be feared with known concentrated solutions.

The dispersions according to the first aspect of the invention are ready-for-use dye preparations. Diluted with water (advantageously in a ratio of at least 1:10), they can be used directly as liquor for the dyeing and printing of organic materials such as leather, wool, silk, cellulose acetate, tanned cotton and, in particular, for the dyeing and printing of polymeric and copolymeric acrylonitrile fiber material. By stirring the preparations in dilute aqueous solutions containing suitable thickeners, stable dyeing liquors or pastes are obtained which are excellently suitable for use in continuous dyeing and printing processes.

The following non-limitative examples illustrate this invention aspect further. The temperatures are given therein in degrees Centigrade.

EXAMPLE 1

A solution is prepared of 45 g of sodium chloride, 20 g of acetic acid and 30 g of a fatty alcohol polyglycol ether, obtained by condensation of a mixture of fatty alcohols containing 11 – 18 carbon atoms with double the amount by weight of ethylene oxide in 300 g of water. 360 g of moist dyestuff filter cake composed of 120 g of dyestuff of the formula

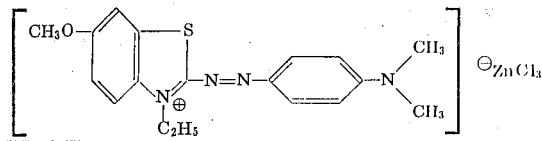

24 g of sodium chloride and 216 g of water, are stirred into the above solution and the whole is homogenized for 4 hours.

The dark blue, concentrated, liquid dye preparation so produced is stable to storing and is ready for direct use. On adding 100 times the amount of the preparation of cold or warm water thereto and also the auxiliaries usual in dyeing, a liquor is obtained which can be used direct for the dyeing of acrylonitrile fibers from a short bath.

Suitable acrylic fibers which can be dyed or printed using the above dye preparation are, in particular, polymeric and copolymeric, long chain acrylonitrile which contain acid dye sites. Such fibers consist, e.g., of polyacrylonitrile of a polymerisation degree of about 35,000, containing about 150 mM carboxyl groups and no sulfonic acid groups per 100 g fiber ("COURTELLE", Courtaulds Ltd., Coventry, England). Other acrylic fibers usable according to the invention consist of polyacrylonitrile having a similar degree of polymerisation but about 40 to 50 mM sulfonic acid groups and 15 to 20 mM carboxyl groups per 100 g of fiber ("ORLON", E. I. Du Pont de Nemours & Co., Wilmington, Del., USA), also "ACRILAN", The Chemstrand Corp., Dekatur, Ala., USA, consisting of a copolymer from about 85 percent acrylonitrile and about 15 percent vinyl acetate, or "DRALON", Farbenfabriken Bayer, Dormagen, Germany, consisting of 85 percent acrylonitrile, about 5 – 10 percent vinyl acetate and about 10–15 percent vinyl pyridine.

Other equally good dye preparations are obtained in the same way and under the same conditions as described in the above example if, instead of the 30 g of fatty alcohol polyglycol ether, the following are used: 25 g of a nonylphenol polyglycol ether the polyglycol ether chain of which consists of 8 to 12 ethyleneoxy groups; 12 g of a condensation product of N-octadecyl-diethylenetriamine and double the amount by weight of ethylene oxide; 20 g of the condensation product of oleic acid and ethylene oxide (molecular ratio 1:7.5); 30 g of permethylated N-octadecyl-diethylenetriamine having a polyglycol ether chain containing 15 to 20 ethyleneoxy groups.

If in the above example, the dyestuff component of the filter cake is replaced by corresponding amounts of the cationic color salts given in column 2 of the following Table I and otherwise the procedure given in the example is followed, then dye preparations which are ready for direct use and are stable on storing are also obtained.

TABLE I
| Number | Dyestuff | Shade on polyacrylonitrile fibers |
|---|---|---|
| 2 | 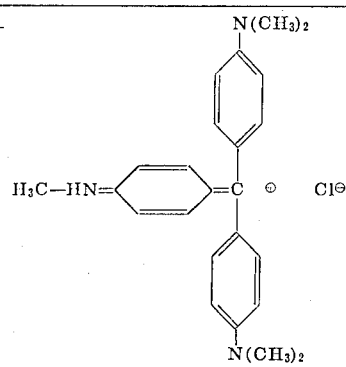 | Violet. |
| 3 | 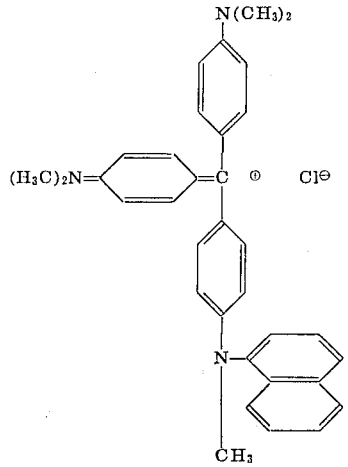 | Blue. |
| 4 | 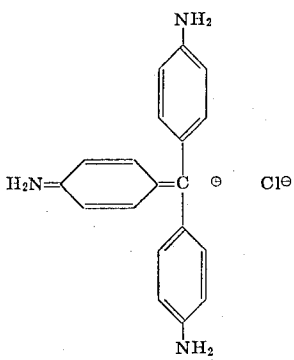 | Fuchsin. |
| 5 | 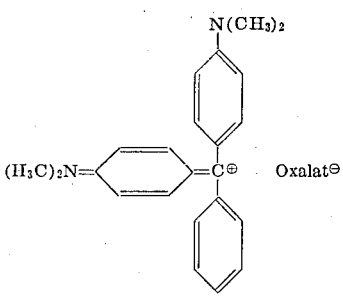 | Green. |
| 6 | 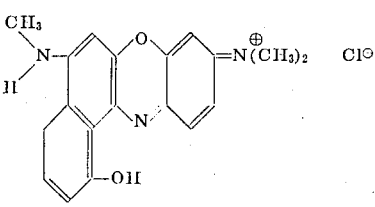 | Blue. |

Table I—Continued
| Number | Dyestuff | Shade on polyacrylonitrile fibers |
|---|---|---|
| 7 | 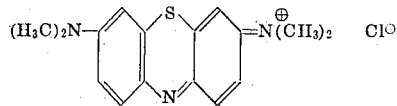 | Do. |
| 8 | 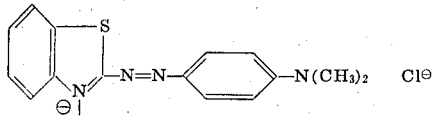 | Do. |
| 9 | 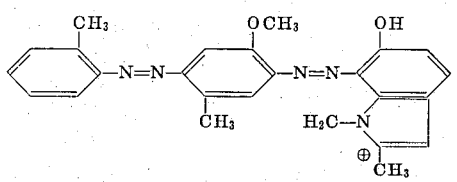 | Claret. |
| 10 | 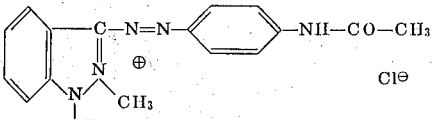 | Orange. |
| 11 | 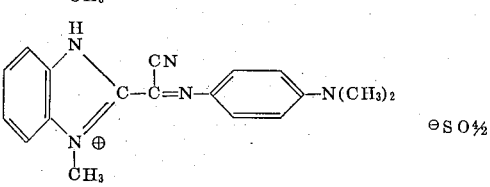 | Yellow. |
| 12 | 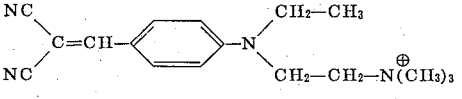 | Do. |
| 13 | 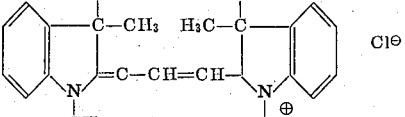 | Red. |
| 14 | 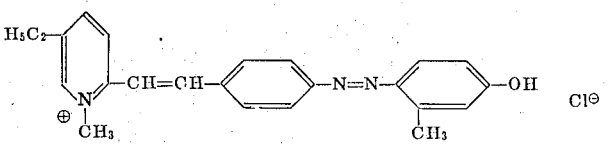 | Yellow-orange. |
| 15 | 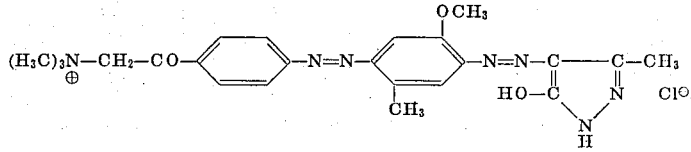 | Orange. |
| 16 | 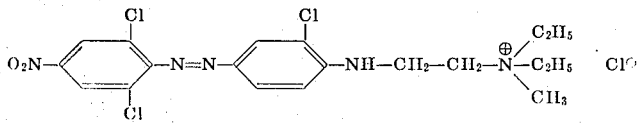 | Do. |
| 17 | 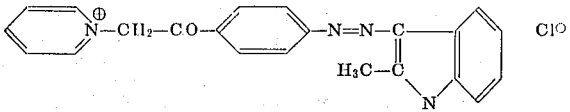 | Yellow. |
| 18 | 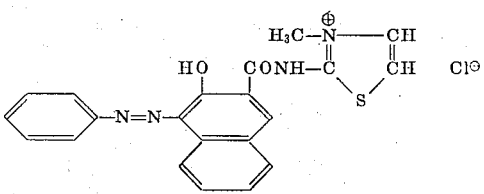 | Red. |

Table I—Continued

| Number | Dyestuff | Shade on polyacrylonitrile fibers |
|---|---|---|
| 19 | O₂N–C₆H₄–N=N–C₆H₄–N(C₂H₅)(C₂H₄–S⁺=C(NH₂)₂) Cl⁻ | Red. |
| 20 | 1-[NH–CH₂–CH₂–CO–NH–CH₂–CH₂–N⁺(CH₃)₃]-8-hydroxyanthraquinone, SO₄CH₃⁻ | Red. |
| 21 | 1-(NH–CH₃)-4-[NH-(3,5-dimethyl-2-(CH₂–N⁺(CH₃)₃)phenyl)]anthraquinone, Cl⁻ | Blue. |
| 22 | 1-methyl-2-[4-(N,N-dimethylamino)phenylazo]pyridinium, SO₄CH₃⁻ | Violet. |
| 23 | 1-methyl-2-[(4-aminophenyl)azo]pyridinium, Cl⁻ | Red. |
| 24 | 1,4-dimethyl-2-[(4-aminophenyl)azo]pyrazinium(?), ZnCl₃⁻ | Orange. |
| 25 | 6-methoxy-3-methyl-2-[(4-morpholinophenyl)azo]benzothiazolium, Cl⁻ | Blue. |
| 26 | 6-methoxy-3-(CH₂CH₂CONH₂)-2-[4-(N,N-diethylamino)phenylazo]benzothiazolium, Cl⁻ | Do. |
| 27 | 6-methoxy-3-(CH₂CH₂CN)-2-[4-(N,N-diethylamino)phenylazo]benzothiazolium, Cl⁻ | Do. |
| 28 | 3-(CH₂CH₂CN)-2-[(2-methylindol-3-yl)azo]thiazolium, Cl⁻ | Red. |

Table I—Continued

| Number | Dyestuff | Shade on polyacrylonitrile fibers |
|---|---|---|
| 29 | (structure with thiazole, azo, carbazole, CH₂CH₂—CO—NH₂, Cl⁻) | Red. |
| 30 | (nitroindazole azo aminophenyl NHCOCH₃, Cl⁻) | Blueish red. |
| 31 | (bis-nitroindazole connected via N=C(CH₃)—N=N, Cl⁻) | Blue. |
| 32 | (nitroindazole—N=N—C(CH₃)=N—N—nitropyrazole, SO₄²⁻/2) | Green. |
| 33 | (tetramethyl pyrazole N-phenyl, azo to dimethylaminophenyl, CH₃SO₄⁻) | Red. |
| 34 | (nitroindazole azo to dimethylamino naphthyl, Cl⁻) | Navy blue. |
| 35 | (dimethylindolinium —CH=CH—NH— dimethoxyphenyl, SO₄²⁻/2) | Yellow. |
| 36 | (CH₃)₂N⁺= oxazine with N(CH₃)₂ and OCH₃, Cl⁻ | Blue. |
| 37 | (trimethylindolinium —CH=CH— dimethylaminophenyl, SO₄½⁻) | Red. |
| 38 | (N-methyl benzimidazole —CH=N—N= benzothiazoline N-methyl, Cl⁻) | Orange. |

Table I—Continued

| Number | Dyestuff | Shade on polyacrylonitrile fibers |
|---|---|---|
| 39 |  | Red. |
| 40 | (structure shown) | Orange. |

EXAMPLE 41

100 g of magnesium chloride containing crystal water, 2 g of concentrated hydrochloric acid and 0.1 g of fatty alcohol polyglycol ether (obtained by condensation of a mixture of fatty alcohol containing 11 to 18 carbon atoms with twice the amount of ethyleneoxide) are dissolved in 60 g of water.

20 g of a dyestuff of the formula

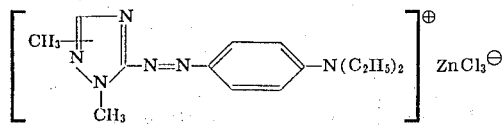

are added to the above-described solution and ground for 6 hours in the presence of sand (glass pearls). The dye preparation so obtained is very stable; the undissolved dyestuff does not form a sediment and, even after storing for a long time, has no tendency to crystallize out. On pouring over the preparation 1,000 times its amount of warm water, a liquor is obtained which can be used direct for the dyeing of acrylic fibers from a long bath.

Other dye preparations are obtained if the procedure given in Example 41 is followed but, instead of 100 g of magnesium chloride, 65 g of sodium nitrate, 110 g of sodium sulfate, 150 g of sodium acetate, 40 g of potassium sodium tartrate, 75 g of sodium chloride, 75 g of zinc sulfate, 40 g of aluminum sulfate, 60 g of potassium tartrate, 70 g of potassium citrate, 65 g of ammonium oxalate are used.

Similar dye preparations are also obtained if 15 g of a locust bean flour thickener are added to the above solution.

EXAMPLE 42

90 g of sodium chloride, 5 g of formic acid and 30 g of a polyglycol ether, obtained by condensation of a mixture of fatty alcohols having 11 to 18 carbon atoms with double the amount of ethylene oxide, are dissolved in 410 g of water. 200 g of glass pearls having a diameter of about 1.5 mm and then, while stirring, 120 g of dyestuff of the formula

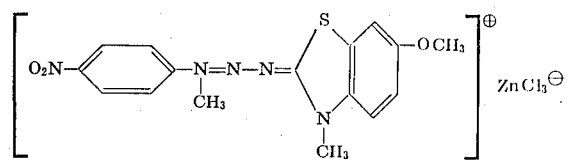

are added to this solution and the dyestuff suspension is stirred for 30 hours at room temperature. 200 g of water are then added and the glass pearls are separated from the finely distributed, undissolved dyestuff by filtration of the milled goods over a copper sieve the mesh width of which is 0.5 mm. In this way, a homogeneous, stable, concentrated, liquid dye preparation is obtained. On pouring over the preparation 1,000 times the amount of water and after addition of the auxiliaries usual in dyeing, a liquor is obtained which can be used direct for the dyeing of polymeric or copolymeric acrylonitrile fibers.

EXAMPLE 43

8 g of the dye preparation produced according to example 1 and 40 g of 80 percent acetic acid, 50 g of sodium sulfate and 10 g of an addition product of 15 – 20 equivalents of ethylene oxide to N-octadecyl-diethylenetriamine which has been quaternised with dimethyl sulfate, are dissolved in 5,000 ml of water. 100 g of polyacrylonitrile yarn ("Orlon" 42) are introduced at 60°, the liquor is heated within 10 minutes to 80°, then the temperature is raised by half a degree per minute until the boil is reached whereupon the material is left in the liquor at this temperature for 2 hours. The liquor is then cooled to 60° within 30 minutes. The material so dyed is then removed from the bath and rinsed with lukewarm and cold water.

Polyacrylonitrile yarn dyed a very even blue shade is obtained.

On following the above prescription, the dye preparations given in the other examples produce dyeings of similar quality on polyacrylonitrile fibers.

EXAMPLE 44

Polyacrylonitrile fabric such as "Orlon" 42, is impregnated in a foulard at 40° with a liquor of the following composition:

20 g of the dye preparation obtained according to example 42 are dissolved in a thickener solution consisting of 5 g of locust bean flour thickener and 885 ml of water, 60 g of acetic acid (80 percent) and 30 g of coconut oil fatty acid diethanolamide are then added.

The fabric which has been squeezed out to about 120 percent liquor content is steamed for 30 minutes at 102°. The dyed goods are rinsed with water, soaped and dried. Under these conditions a very level yellow dyeing is obtained.

If in the above example, instead of polyacrylonitrile fabric, cellulose acetate fabric is used and otherwise the procedure given in the example is followed, then a very level yellow dyeing is also obtained.

The dye preparations described in the other examples produce dyeings of similar quality by this process.

According to a second aspect of the invention stable dispersions of water-soluble anionic dyestuffs are provided which are particularly suitable for the dyeing and printing of fiber materials consisting of natural and/or of synthetic polyamide and/or of natural or regenerated cellulse.

Water-soluble anionic dyestuffs have hitherto been sold in the form of finely ground, more or less intensely dusty powders. Handling such dusty dyestuff powders may easily lead to an annoying contamination of the surroundings and to staining of the clothes and faces and hands of the personnel handling these dyestuff powders. Such handling, therefore, requires the use of suitable protective devices, such as ventilation equipment. The contamination of the air by dyestuff particles can lead to a staining of other dyeable materials thus rendering useless for example colorless textiles or textiles dyed in one shade. Moreover, very finely ground anionic dyestuffs tend very readily to form dyestuff lumps during storage in a moist atmosphere.

It is indeed possible to render dyestuffs dust-free by compressing or granulating them, but the resulting preparations often have properties differing from those of the starting materials. Thus, powders which have been compressed into granules, tablets or briquettes are frequently difficult to dissolve or disperse. Therefore, in practice the addition of wetting oils or of appreciable quantities of hygroscopic liquids, such as glycerine, is usually recommended. Both known methods are unsatisfactory when applied alone, since, particularly in the case of intensely dusty powders, the amount of dust given off, while being reduced, is in no way eliminated and the formation of lumps is difficult to avoid. The same also applies to the mere moistening of anionic dyestuff powders with water. More recently, therefore, the known methods mentioned above have only been used in combination with other measures. Thus, polyvalent aliphatic alcohols having hygroscopic properties and water have been used; which, however, does not guarantee constant satisfactory results; or the powders have been wetted with paraffin oil and subsequently rendered compact by the removal of air under vacuum which requires special equipment. The known bonding of the powder particles by moistening with steam in a turbulence zone leads only to a reduction but not to a satisfactory elimination of the dustiness of the powders.

In addition, it is often difficult to dissolve pulverulent anionic dyestuffs in water, since they are not easily wetted and form lumps when water is added, so that the preparation of dye liquors is often difficult and frequently very time-consuming.

This invention aspect provides for the first time, stable dispersions of water-soluble anionic dyestuffs of concentrated fluid consistency which can be produced in a simple manner and without modification of their dyeing properties, which are easily soluble in water and which are essentially free of the above-mentioned disadvantages.

These novel stable dispersions have, as characteristic feature, a content of, calculated on the total weight of the dispersion, a. at least 10 percent and at most 60 percent by weight of water-soluble anionic dyestuff,
b. about 0.2 to 15 percent by weight of stabilizing agent, the balance consisting of
c. water and, dissolved in the latter,
d. salt which is at least sparingly soluble in water and consists of the anion of an inorganic or organic mono- or polybasic acid, and of the cation of an inorganic mono- or polyacid base, the salt concentration in the water being high enough to keep the water-soluble dyestuff substantially undissolved. This prevents a recrystallization of the dyestuff and resulting uncontrolled modifications in the viscosity of the dispersion.

Here and in the following invention description as well as in the appended claims the term "anionic dyestuff" designates a dyestuff molecule consisting of an anionic and a cationic moiety, the chromophoric structure of the dyestuff being present in the anionic moiety, and the cationic moiety consisting of hydrogen, lithium, sodium, potassium or ammonium.

A "sparingly soluble" salt is a salt at least 1 part by weight of which is soluble in 100 parts of water.

The anions of water-soluble salts usable according to the second aspect of the invention are primarily those from inorganic mono- or polybasic mineral acids, e.g., from hydrochloric acid, hydrobromic acid, nitric or sulfuric acid. They can also be those from organic mono- or polybasic, optionally substituted carboxylic acids; especially unsubstituted or hydroxyl-substituted lower aliphatic mono- di- and tricarboxylic acids; furthermore monocyclic-aromatic monocarboxylic acids. Suitable anion donors are in the case of lower fatty acids, e.g., formic, acetic and glycolic acid; in the case of unsubstituted dicarboxylic acids, e.g., oxalic acid, malonic, succinic, maleic, fumaric, glutaric and adipic acid; in the case of hydroxyl-substituted di- and tricarboxylic acids, e.g., tartaric acid and citric acid. Suitable anions of mononuclear aromatic carboxylic acids are for example those of benzoic acid, chlorobenzoic acid, methylbenzoic acid and salicylic acid.

Suitable cations of water-soluble salts usable in this aspect of the invention are alkali metal ions such as sodium or potassium ions, ammonium ions, mono-, di- and trialkylammonium ions, alkaline earth metal ions such as magnesium, calcium or zinc ions and also aluminium ions.

As water-soluble salts of inorganic and organic polybasic acids, also their acid salts can be used in this invention aspect. The neutral salts, however, are preferred. Examples of suitable inorganic salts are, in particular, the neutral alkali metal, ammonium or alkaline earth metal salts of strong, inorganic mono- or polybasic acids such as sodium, potassium and ammonium chloride; magnesium, calcium or zinc chloride; sodium, potassium and ammonium bromide; sodium, potassium and ammonium nitrate; sodium, potassium and ammonium sulfate; sodium, potassium and ammonium phosphate; or mixtures thereof; examples of suitable salts of organic acids are, in particular, the alkali metal salts of lower fatty acids, especially sodium and potassium acetate, citrate and tartrate. Water-soluble neutral alkali metal or ammonium salts of strong inorganic mono- or polybasic acids, especially sodium chloride, are particularly preferred.

Examples of suitable water-soluble anionic dyestuffs which can be used in their dispersions according to the invention are acid wool dyestuffs as well as reactive and substantive dyestuffs, such as the alkali metal or ammonium salts of sulfonic or carboxylic acid dyestuffs or of 2:1 metal complex dyestuffs, namely metal-free or metallized monoazo-, disazo- (including formazane) or polyazo-dyestuffs, and the chromium, cobalt, nickel and copper complexes thereof; and metallized monoazo dyestuffs, especially those having two axo dyestuff molecules bound to one coordinatively hexavalent heavy metal atom; as well as anthraquinone, nitro and also phthalocyanine dyestuffs. After-chromable dyestuffs, especially afterchromable azo dyestuffs, are also suitable. Suitable reactive dyestuffs are those which are capable of reacting with wool or cotton fibers, especially those which are azo, anthraquinone or phthalocyanine dyestuffs.

Stabilizing agents contained in the dispersions according to the second aspect of the invention are preferably anionic and/or non-ionogenic.

Examples of suitable anionic stabilizing agents are:

1. the salts designated as soaps, namely the sodium, potassium, ammonium, N-alkyl-, N-hydroxyalkyl-, N-alkoxyalkyl- or N-cyclohexylammonium, or the hydrazinium and morpholinium salts of fatty acids having 10 to 20 carbon atoms, such as lauric, palmitic, stearic or oleic acid; e.g., sodium laurate; sodium stearate;

2. sulfated primary or secondary, purely aliphatic alcohols having eight to 18 carbon atoms in the alkyl chain, e.g., sodium lauryl-sulfate, sodium $\alpha$-methyl stearyl-sulfate, sodium tridecyl-sulfate, sodium oleyl-sulfate, potassium stearyl-sulfate or the sodium salt of coconut fatty alcohol-sulfate;

3. sulfated unsaturated higher fatty acids or fatty acid esters, such as oleic acid, elaidic acid or ricinoleic acid, or the lower alkyl esters thereof, e.g., the ethyl, propyl or butyl esters, and the oils containing such fatty acids, such as olive oil, castor oil, rape oil, etc.; e.g., disodium heptadecyl carboxylate sulfate;

4. sulfated ethyleneoxy adducts, such as sulfated addition products of 1 to 10 moles of ethylene oxide with fatty acid amides, mercaptans or amines, especially, however, with fatty acids, aliphatic alcohols or alkyl phenols having eight to 20 carbon atoms in the alkyl chain, e.g., with stearic acid, oleic acid, lauryl alcohol, myristyl alcohol, stearyl alcohol, oleyl alcohol, octylphenol or nonylphenol ; e.g., sodium salt of sulfated lauryl alcohol triglycolether or sodium octylphenyl deca-ethylene glycol-sulfate;

5. the sulfates of N-acylated alkanolamines, e.g., the sulfated amides of caprylic, pelargonic, capric, lauric, myristic or stearic acid, or of lower fatty acids substituted by alkylphenoxy groups, such as octyl- or nonylphenoxy acetic acid with mono- or bis-hydroxyalkylamines such as $\beta$-hydroxyethyl-amine, $\gamma$-hydroxypropyl-amine, $\beta,\gamma$-dihydroxypropyl-amine, bis-($\beta$-hydroxyethyl)-amine, or with N-alkyl-N-hydroxyalkyl-amines such as N-methyl, or N-ethyl-N-($\beta$-hydroxyethyl)-amine; e.g.,sodium salt of sulfated nonylphenoxy acetic acid-bis-$\beta$-hydroxyethylamide;

6. sulfated esterified polyoxy compounds, e.g., sulfated, partially esterified polyvalent alcohols, such as the sodium salt of the sulfated monoglyceride of palmitic acid;

7. primary and secondary alkyl-sulfonates, the alkyl chain of which contains 10 to 20 carbon atoms, e.g., sodium dodecylsulfonate, sodium hexadecane-sulfonate-8 , sodium stearyl-sulfonate;

8. alkyl-aryl sulfonates such as alkali metal alkyl-benzene sulfonates with straight or branched alkyl chain of at least 7 carbon atoms, e.g., sodium dodecyl-benzene sulfonate, 1,3,5,7-tetramethyl-octylbenzene sulfonate, sodium octadecylbenzene sulfonate; or such as alkyl naphthalene sulfonates, e.g., sodium-1-isopropyl-naphthalene-2-sulfonate, sodium dibutyl-naphthalene sulfonate;

9. alkali metal sulfonates of polycarboxylic acid esters, e.g., sodium dioctyl-sulfosuccinate, sodium dihexyl-sulfophthalate.

Instead of the sulfates, esters with other polyvalent mineral acids, e.g., phosphates, can also be used;

10. condensation products of aryl sulfonic acids with formaldeyhyde, such as alkali metal dinaphthyl-methane sulfonates, e.g., the disodium salt of di-(6-sulfonaphthyl-2)-methane.

Examples of suitable non-ionogenic stabilizing agents are:

11. addition products of alkylene oxides, especially from ethylene oxide, with higher fatty acids, fatty acid amides, aliphatic alcohols, mercaptans or amines, with alkyl phenols or alkyl thiophenols, the alkyl radicals of which have at least seven carbon atoms. Preferred are polyglycol-mono-alkyl-phenyl ethers with 2 to 20 optionally substituted glycol units, the alkyl group of which has eight to 12 carbon atoms, such as tri-(1,2-propylene-glycol)-mono-nonylphenyl ether, penta-ethylene-glycol-mono-octylphenyl) ether or deca-ethyleneglycol-mono-nonylphenyl ether;

12. esters of polyalcohols, in particular monoglycerides of fatty acids with 12 to 18 carbon atoms, e.g., the monoglycerides of lauric, stearic or oleic acid;

13. N-acylated alkanolamines of the same type given for the sulfates of these compounds, thus e.g., the N,N-bis ($\omega$-hydroxyalkyl)-amides of the mixture of acids known by the generic term "coconut oil fatty acids," primarily N,N-bis($\beta$-hydroxy-ethyl)- or N,N-bis($\gamma$-hydroxypropyl)-amides, also the addition products of ethylene oxide with these N-acylated alkanol amines;

14. the reaction products of higher fatty acids with an alkanol amine, whereby the molar ratio of alkanol amine to fatty acid is greater than 1, e.g., 2. As fatty acids those having eight to 18 carbon atoms as well as the mixtures designated as coconut oil fatty acids are particularly suitable, and diethanol amine is a particularly suitable alkanol amine. Substances of this sort are described in U.S. Pat. No. 2,089,212. These compounds are not uniform in nature and some have cationic characteristics.

The technically available stabilizing agents of the classes named are usually not uniform products, but rather mixtures of homologues of the compounds mentioned.

Preferred are anionic and/or non-ionogenic stabilizing agents which are condensation products of aryl sulfonic acids and formaldehyde, alkali-metal sulfates of higher alkanols or addition products of ethylene oxide with higher aliphatic alcohols or alkylphenols as defined under 10, 2 and 11, supra.

As other auxiliaries, the dispersions according to the second aspect of this invention can contain up to about 5 percent by weight of organic acid such as formic or acetic acid; up to about 10 percent by weight of thickeners such as alginates, locust bean flour, alkyl celluloses of crystal gum; up to 1 percent by weight of antifoaming agents such as higher fatty alcohols, higher molecular fatty acid esters or silicone oils; up to about 2 percent of wetting agents such as alkyl naphthalene sulfonates and up to about 10 percent by weight of detergent agents such as fatty acid condensation products, or textile finishing agents, e.g., textile softeners, antistatic agents and antisoiling agents such as quaternary ammonium compounds or fatty acid condensation products, for example, condensation products of fatty acids with polyoxy compounds.

The amount of anionic dyestuff in the dispersions should be as high as possible, being preferably from 30 to 60 percent by weight of the total dispersion. The upper limit is determined by the fact that the preparations should still be flowable.

The amount of salt contained in the dispersion should always be high enough to ensure that the water-soluble anionic dyestuff is substantially undissolved. The minimum content required for the production of stable dispersions depends, on the one hand, on the water-solubility of the anionic dyestuff used and, on the other hand, on the solvatation properties of the salt used. In certain cases, a slat concentration of 3 percent is sufficient. Preferably, the salt content of the preparations according to this aspect of the invention is from about 5 to 40 percent. A high salt concentration can improve the rheological properties of the preparation, which is of particular importance when the preparation is stored for a prolonged time; on the other hand, however, difficulties with regard to the solubility of the preparations can arise when they are to be diluted with water. The optimal salt concentration must, therefore, be determined empirically in each case.

The amount of stabilizing agent in these dispersions is preferably about 0.5 to 10 percent of their weight.

The amount of water in the stable dispersions is generally between 40 and 85 percent, preferably between 50 and 70 percent of their weight.

The dispersions according to the second aspect of the invention are produced, advantageously, by stirring the anionic dyestuff, preferably in the form of a moist filter cake or also as powder or aqueous solution or suspension, into the mixture of the other components consisting of an aqueous salt solution, the stabilizing agent and optionally other auxiliaries., at room temperature, preferably not above 50°C, using the usual technical mixing apparatus, such as stirring equipment, homogenizers or kneading apparatus, e.g., high velocity stirrers, turbomixers or kneaders. In many cases it is of advantage to add the main part of the stabilizing agent to the preparation after the other components have been homogenized. If often also proves advantageous to simultaneously distribute the anionic dyestuff mechanically, using shearing forces, e.g., grinding particles such as quartz sand or glass beads. The mixing operation is concluded as soon as complete homogenization has been attained which is, usually, after 4 to 6 hours.

In contrast to pulverulent anionic dyestuffs, their dispersions according to the invention have, above all, the great advantage that they can be dissolved immediately by the addition of cold or warm water without the slightest difficulty. The afore-said dispersions can be stored for several months. Above all, they are substantially unaffected by variations in temperature and the dyestuff distributed but not dissolved therein does not form a sediment or can be easily homogeneously distributed by simple stirring or shaking; it also has no tendency to crystallize.

The dispersions of this aspect of the invention are ready-for-use dye preparations. Depending on the type of anionic dyestuff therein, they can be used either diluted with water, advantageously in a weight ratio of at least 1:10, or directly, as liquor for the dyeing and printing of organic materials, in particular fiber material consisting of natural and regenerated cellulose, natural and synthetic polyamide, especially wool and cotton. By stirring the preparations in water or suitable thickeners, stable dyeing liquors or pastes are obtained which are excellently suitable for use in continuous dyeing or printing processes.

The following non-limitative examples illustrate this invention aspect further. The temperatures are given therein in degrees Centigrade.

EXAMPLE 45

While stirring, 900 g of a moist filter cake containing 500 g of the dyestuff of the formula

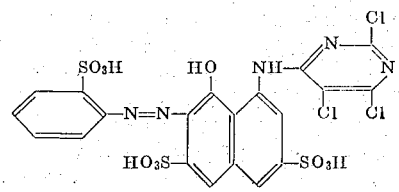

are added to a solution consisting of 800 ml of water, 200 g of sodium chloride and 15 g of the condensation product of 2 parts of naphthalene-2-sulfonic acid and 1 part of formaldehyde, and then homogenized for 3 hours.

The dark red concentrated dyeing preparation obtained in this manner is easily flowable, stable to storage and ready for use. By stirring the preparation in ten times the amount of aqueous thickening agent and adding the auxiliaries usual in printing with reactive dyestuffs, a printing paste for the printing of natural or regenerated cellulose fibers is obtained.

Other dye preparations having similar properties are obtained when the above example is followed, but the 200 g of sodium chloride are replaced by 180 g of potassium chloride, 200 g of ammonium chloride, 100 g of sodium nitrate, 150 g of sodium sulfate, 300 g of sodium acetate, 100 g of potassium nitrate or 100 g of magnesium sulfate.

Similar dye preparations are obtained by adding 150 g of sodium alginate thickener and 5 g of silicone oil to the above solution.

If in the above example, the dyestuff component of the filter cake is replaced by corresponding amounts of the anionic reactive dyestuffs given in column 2 of the following Table II and otherwise the procedure given in the example is followed, then dye preparations which are ready for use and are stable to storage are also obtained.

TABLE II

| Example number | Dyestuff | Shade on natural and regenerated cellulose fibers |
|---|---|---|
| 46 | | Greenish yellow. |
| 47 | | Reddish yellow. |
| 48 | | Blue. |
| 49 | | Orange. |
| 50 | | Turquoise. |
| 51 | | Bordeaux. |

(wherein CuPh designates the copper phthalocyanine radical).

Table II—Continued

| Example number | Dyestuff | Shade on natural and regenerated cellulose fibers |
|---|---|---|
| 52 | | Blue. |
| 53 | | Orange. |
| 54 | | Greenish yellow. |

EXAMPLE 55

75 g of sodium chloride and 5 g of a fatty alcohol polyglycol ether obtained by condensing a mixture of fatty alcohols having 11 to 18 carbon atoms with twice the amount of ethylene oxide, are dissolved in 500 ml of water. 360 g of moist dyestuff filter cake, consisting of 120 g of dyestuff of the formula

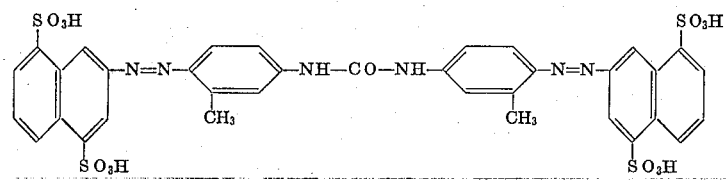

24 g of sodium chloride and 216 ml of water are added to this solution while stirring at room temperature and the mixture is homogenized for 5 hours. The dye preparation thus obtained is very stable; the undissolved dyestuff does not form a sediment and, even after storing for a long time, has no tendency to crystallize. By pouring 500 times the amount of warm water over the preparation, a liquor is obtained which can be used directly for the dyeing of cellulose fibers from a long bath in yellow shades.

Other dye preparations having similar properties are obtained when the procedure given in the above example is followed, but the 75 g of sodium chloride are replaced by 180 g of potassium chloride, 80 g of ammonium chloride, 65 g of sodium nitrate, 110 g of sodium sulfate, 150 g of sodium acetate, 40 g of potassium sodium tartrate, 60 g of potassium tartrate, 70 g of potassium citrate or 65 g of ammonium oxalate. If in the above example, the dyestuff component of the filter cake is replaced by corresponding amounts of the substantive dyestuffs given in column 2 of the following Table II and otherwise the procedure given in the example is followed, then dye preparations which are ready for use and are stable to storage are also obtained.

TABLE III

| Example No. | Dyestuff | Shade on cellulose fibers |
|---|---|---|
| 56 | Benzidine → 1-amino-8-hydroxynaphthalene-3,6-disulfonic acid ←alk.— aniline ↘ m-phenylenediamine | Black. |
| 57 | 5-amino-2-hydroxybenzoic acid → 1-naphthylamine → 2-amino-8-hydroxynapythalene-6-sulfonic acid | Do. |
| 58 | Aniline → 1-aminonaphthalene-7-sulfonic acid → 1-aminonaphthalene-7-sulfonic acid → 2-amino-8-hydroxynaphthalene-6-sulfonic acid. | Grey. |
| 59 | 1-aminobenzene-3-sulfonic acid → 1-aminonaphthalene-7-sulfonic acid → 1-amino-2-methoxy-naphthalene-6-sulfonic acid → [2-amino-5-hydroxy-naphthalene-7-sulfonic acid ← 1-aminobenzene-3-sulfonic acid]. | Blue-green. |
| 60 | Dianisidine → 2-amino-5-hydroxynaphthalene-7-sulfonic acid ← 2-amino-5-nitrobenzoic acid ↘ 2-naphthol-6-sulfonic acid | Navy blue after-coppered. |
| 61 | Benzidine → salicylic acid ↘ [resorcinol ← 2-aminophenol-4-sulfonic acid] copper complex. | Brown. |
| 62 | 2-naphthylamine-4,8-disulfonic acid → N-acetyl-m-phenylenediamine (phosgenated). | Yellow. |
| 63 | o-anisidine-4-sulfonic acid → 5,5'-dihydroxy-7,7'-disulfonic acid 2,2'-dinaphthylurea copper complex | Violet. |
| 64 | p-aminosalicylic acid → 1-amino-2-methoxynaphthalene-6-sulfonic acid → 2-acetoacetylamino-6-naphthol-8-sulfonic acid ← anthranilic acid copper complex. | Green. |
| 65 | 4-aminoazobenzene-3,4'-disulfonic acid → 2-[4'-anilino 6'-p-sulfoanilino-2'-triazinylamino]-5-hydroxy-7-sulfonic acid. | Brilliant red. |

EXAMPLE 66

60 g of sodium chloride, 20 g of 80 percent acetic acid, 30 g of a polyglycol ether, obtained by condensation of a mixture of fatty alcohols having 11 to 18 carbon atoms with twice the amount of ethylene oxide and 10 g of a wetting agent consisting of alkyl naphthalene sulfonates are dissolved in 410 ml of water. 200 g of glass beads having a diameter of about 1.5 mm. and then while stirring, 120 g of the dried dyestuff of the formula

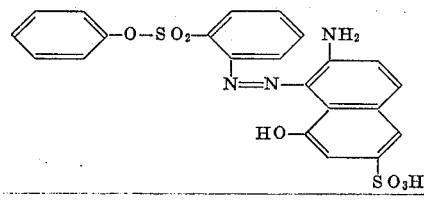

are added to this solution and the dyestuff suspension is stirred for 30 hours at room temperature. The glass beads are then separated from the finely distributed, undissolved dyestuff by filtration of the milled goods over a copper sieve the mesh width of which is 0.5 mm. In this way, a homogeneous, stable, concentrated, liquid dye preparation is obtained. By pouring 500 times the amount of water over the preparation and after adding auxiliaries usual in dyeing, a liquor is obtained which can be used directly for the dyeing of wool in red shades.

Other dye preparations are obtained when the procedure given in the above example is followed, but the 60 g of sodium chloride are replaced by 100 g of potassium chloride or 80 g of sodium sulfate.

EXAMPLE 67

While stirring, 360 g of moist filter cake consisting of 120 g of the anionic dyestuff of the formula

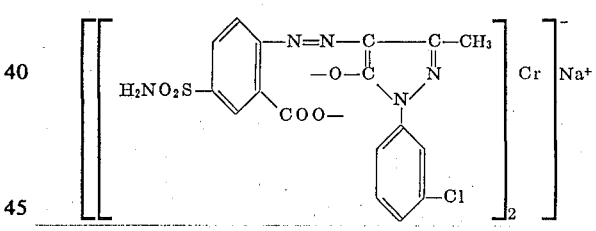

24 g of sodium chloride and 216 ml of water, are added to a solution of 45 g of sodium chloride and 5 g of the condensation product of 2 parts of naphthalene-2-sulfonic acid and 1 part of formaldehyde in 300 ml of water, and then homogenized for four hours.

The yellow, concentrated, liquid dye preparation obtained in this manner is stable to storage and ready for use. By pouring 500 times the amount of cold or warm water over the preparation and after adding auxiliaries usual in dying, a liquid is obtained which can be used directly for the dyeing of wool and synthetic polyamide.

Similar dye preparations are obtained by adding 3 g of silicone oil and 20 g of a fatty acid condensation product to the above solution.

If in the above example, the dyestuff component of the filter cake is replaced by corresponding amounts of the dyestuffs given in column 2 of the following Table IV and otherwise the procedure given in the example is followed, then dye preparations which are ready for use and are stable to storage are also obtained.

TABLE IV

| Example number | Dyestuff | Shade on wool and synthetic polyamide |
|---|---|---|
| 68 | (structure) | Yellow. |
| 69 | (structure, Co complex, Na⁺) | Do. |
| 70 | (structure, Co complex, Na⁺) | Bordeaux. |
| 71 | (structure, Cr complex, Na⁺) | Greenish black. |
| 72 | (structure, Cr complex, Na⁺) | Green. |
| 73 | (structure, Cr complex, Na⁺) | Brown. |
| 74 | 4,4'-bis-(o-diazophenyl-sulfonyloxy)-diphenylmethane ⇌ 1-phenyl-3-methyl-5-aminopyrazole-4'-sulfonic acid (2 equivalents). | Yellow. |
| 75 | 4,4'-bis-(o-diazophenyl-sulfonyloxy)-diphenylmethane ⇌ 2-aminonaphthalene-5-sulfonic acid (2 equivalents). | Orange. |
| 76 | 4,4'-bis-(o-diazophenyl-sulfonyloxy)-diphenylmethane ⇌ 2-amino-8-hydroxy-naphthalene-6-sulfonic acid (2 equivalents, acid). | Red. |

Table IV—Continued

| Example number | Dyestuff | Shade on wool and synthetic polyamide |
|---|---|---|
| 77 | (1-amino-4-anilino-anthraquinone-2-sulfonic acid) | Blue. |
| 78 | bis-anthraquinone dye linked via biphenyl-diamine (1-amino-2-sulfo-4-amino anthraquinone coupled to 4,4'-diaminobiphenyl) | Do. |
| 79 | 2,4-dinitro-4'-(phenylamino)-2'-sulfo-diphenylamine derivative | Orange. |
| 80 | 4-sulfophenylazo-2-naphthol | Do. |
| 81 | 1-amino-2-methyl-4-(3-sulfo-4-methylanilino)anthraquinone | Blue. |
| 82 | phenyl-azo-phenyl-azo-(1-hydroxy-naphthalene-5,7-disulfonic acid) | Scarlet. |
| 83 | Cu-complex azo dye with $SO_2NH_2$-substituted sulfonyl-phenyl group, Na$^+$ salt | Blue. |
| 84 | Cu-complex azo dye, dichloro-substituted, with $SO_2$-N($C_2H_5$)-phenyl-$SO_3$ group, 2Na$^+$ salt | Do. |

Table IV — Continued

| 1 | 2 | 3 |
|---|---|---|
| Example number | Dyestuff | Shade on wool and synthetic polyamide |
| 85 | 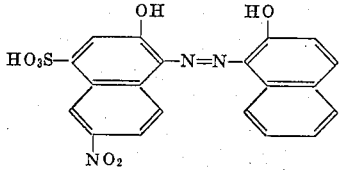 | Black after-chromed. |

EXAMPLE 86

10 g of the dye preparation produced according to Example 45 (without thickener) are dissolved in 3,000 ml of water and then 60 g of trisodium phosphate are added. 100 g of cotton are introduced at 40° and the temperature is raised within 30 minutes to 80°, while simultaneously adding sodium chloride in such an amount that by completion of the addition there are 150 g per liter. Dyeing is performed at this temperature for one hour. Then the dyed goods are soaped for 30 minutes at the boil, rinsed and dried.

A very level red dyeing is obtained.

EXAMPLE 87

Wool flannel is impregnated at 40° on a pad mangle with a dyeing liquor of the following composition:

200 g of the dye preparation obtained according to Example 66 are dissolved in a thickening solution consisting of 5 g of locust bean flour thickener and 705 ml of water. 60 g of 80 percent acetic acid and 30 g of coconut oil fatty acid diethanol amide are then added to the solution.

The fabric, squeezed to about 120 percent pick-up, is steamed at 102° for 30 minutes. The dyed goods are rinsed with water, soaped and dried. Under these conditions a very level red wool dyeing is obtained.

What is claimed is:

1. A stable dispersion of a water-soluble cationic dyestuff consisting essentially of
   a. from 10 percent to 30 percent by weight of a water-soluble cationic color salt,
   b. from about 1 to 5% by weight of an acid selected from the group consisting of hydrochloric acid, sulphuric acid, formic acid and acetic acid,
   c. from 0.5 to 15 percent by weight of a cationic or non-ionic stabilizer, all percentages being calculated on the total weight of the dispersion, the balance of the dispersion consisting essentially of
   d. water and, dissolved in the water,
   e. at least 5 percent by weight, based on the total weight of the dispersion, of a water-soluble alkali metal, alkaline earth metal or ammonium salt of
      i. an inorganic acid selected from the group consisting of hydrochloric acid, nitric acid and sulphuric acid, or
      ii. an organic acid selected from the group consisting of lower aliphatic mono-, di- and tricarboxylic acids, hydroxyl substituted lower aliphatic mono-, di and tricarboxylic acids and mononuclear aromatic monocarboxylic acids.

2. The dispersion as defined in claim 1, wherein the acid defined under (b) is formic or acetic acid.

3. The dispersion as defined in claim 2, wherein the water-soluble salt is sodium chloride, the acid is acetic acid and the stabilizer is a fatty alcohol polyglycol ether.

4. The dispersion as defined in claim 2, wherein the water-soluble salt is magnesium chloride, the acid is acetic acid and the stabilizer is a fatty alcohol polyglycol ether.

5. The dispersion as defined in claim 1, wherein the stabilizer is a non-ionic stabilizer.

6. The dispersion as defined in claim 1, wherein the content of salt component (e) in the dispersion is 5–25 percent by weight of the dispersion.

* * * * *